(12) United States Patent
Schroeter et al.

(10) Patent No.: US 10,432,797 B2
(45) Date of Patent: *Oct. 1, 2019

(54) PRE-DISTORTION SYSTEM FOR CANCELLATION OF NONLINEAR DISTORTION IN MOBILE DEVICES

(71) Applicant: AT&T Intellectual Property I, L.P., Atlanta, GA (US)

(72) Inventors: Horst J. Schroeter, New Providence, NJ (US); Donald J. Bowen, Madison, NJ (US); Dimitrios Dimitriadis, Rutherford, NJ (US); Lusheng Ji, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/978,592

(22) Filed: May 14, 2018

(65) Prior Publication Data

US 2018/0262623 A1  Sep. 13, 2018

Related U.S. Application Data

(63) Continuation of application No. 14/543,261, filed on Nov. 17, 2014, now Pat. No. 9,973,633.

(51) Int. Cl.
*H04M 9/08* (2006.01)
*H04R 29/00* (2006.01)
(Continued)

(52) U.S. Cl.
CPC .............. *H04M 9/082* (2013.01); *H04R 3/04* (2013.01); *H04R 29/00* (2013.01); *G10L 2021/02082* (2013.01); *H04R 2499/11* (2013.01)

(58) Field of Classification Search
CPC ......... H04M 9/082; G10L 2021/02082; H04R 3/04; H04R 29/00; H04R 2227/003; H04R 2499/11
See application file for complete search history.

(56) References Cited

U.S. PATENT DOCUMENTS

| 5,475,731 A | 12/1995 | Rasmusson |
| 5,485,522 A | 1/1996 | Solve et al. |

(Continued)

FOREIGN PATENT DOCUMENTS

GB  2245459  1/1992

OTHER PUBLICATIONS

"Vocal Echo Cancellation" www.vocal.com, http://www.vocal.com/echo-cancellation/?gclid=CL7unMm5p74CFe99Ogod5xAAdg#!prettyPhoto.
(Continued)

*Primary Examiner* — Davetta W Goins
*Assistant Examiner* — Daniel R Sellers
(74) *Attorney, Agent, or Firm* — Akerman LLP; Michael K. Dixon; Mammen (Roy) P. Zachariah, Jr.

(57) ABSTRACT

A pre-distortion system for improved mobile device communications via cancellation of nonlinear distortion is disclosed. The pre-distortion system may transmit an acoustic signal from a network to a device, wherein the acoustic signal includes a linear signal and a nonlinear cancellation signal that cancels at least a portion of nonlinear distortions created once a loudspeaker in the device emits the linear signal. Thus, when a loudspeaker of a mobile device is operating and nonlinear distortions are generated by the loudspeaker or adjacent components of the mobile device in close proximity to the loudspeaker, the pre-distortion system may create one or more nonlinear cancellation signals in the network. The nonlinear cancellation signal may be com-
(Continued)

bined with the linear signal sent to the loudspeaker to cancel the nonlinear distortion signal created by the loudspeaker emitting acoustic sounds from the linear signal. Thus, the nonlinear cancellation signal becomes a pre-distortion signal.

20 Claims, 5 Drawing Sheets

(51) Int. Cl.
  *H04R 3/04* (2006.01)
  *G10L 21/0208* (2013.01)

(56) References Cited

U.S. PATENT DOCUMENTS

| | | | |
|---|---|---|---|
| 5,680,450 A | 10/1997 | Dent et al. | |
| 5,889,857 A | 3/1999 | Boudy et al. | |
| 5,937,060 A | 8/1999 | Oh | |
| 6,507,653 B1 | 1/2003 | Romesburg | |
| 6,563,803 B1 | 5/2003 | Lee | |
| 6,570,985 B1 | 5/2003 | Romesburg | |
| 6,674,864 B1 * | 1/2004 | Kitamura | H03G 5/005 381/103 |
| 6,678,254 B1 | 1/2004 | Song | |
| 6,738,358 B2 | 5/2004 | Bist et al. | |
| 6,859,538 B1 * | 2/2005 | Voltz | H04R 3/04 381/101 |
| 6,912,209 B1 | 6/2005 | Thi et al. | |
| 7,068,780 B1 | 6/2006 | Levonas et al. | |
| 7,426,270 B2 | 9/2008 | Alves et al. | |
| 7,433,462 B2 | 10/2008 | Hodges et al. | |
| 7,440,891 B1 | 10/2008 | Shozakai et al. | |
| 7,451,085 B2 | 11/2008 | Rose et al. | |
| 7,502,461 B2 | 3/2009 | Liu | |
| 7,684,559 B2 | 3/2010 | Hoshuyama | |
| 7,907,977 B2 | 3/2011 | Fratila | |
| 8,279,783 B1 | 10/2012 | Bates et al. | |
| 8,320,553 B2 | 11/2012 | Yue et al. | |
| 8,467,543 B2 | 6/2013 | Burnett et al. | |
| 8,498,423 B2 | 7/2013 | Thaden et al. | |
| 8,644,522 B2 | 2/2014 | Leblanc et al. | |
| 9,633,671 B2 * | 4/2017 | Giacobello | H04M 9/082 |
| 2004/0001597 A1 | 1/2004 | Marton | |
| 2005/0129226 A1 | 6/2005 | Piket et al. | |
| 2005/0271216 A1 * | 12/2005 | Lashkari | H04R 3/04 381/59 |
| 2006/0153359 A1 | 7/2006 | Stenger | |
| 2008/0101619 A1 * | 5/2008 | Shmunk | H04R 3/04 381/59 |
| 2009/0034750 A1 | 2/2009 | Ayoub et al. | |
| 2012/0287769 A1 | 11/2012 | Saleem et al. | |
| 2013/0163780 A1 * | 6/2013 | Blair | H04R 3/12 381/77 |
| 2013/0243117 A1 | 9/2013 | Jeckeln | |

OTHER PUBLICATIONS

"Acoustic Echo Cancellation Using NLMS-Nueral Network Structures" www.maplebrook.com, http://www.maplebrook.com/about/doc/icassp95.pdf.

"Q-SYS" qsc.com, http://qsc.com/media-and-eventstnews/q-sys-offers-acoustic-echo-cancellation-standardfeature/.

* cited by examiner

PRE-DISTORTION SYSTEM FOR CANCELLATION OF NONLINEAR DISTORTION IN MOBILE DEVICES

CROSS-REFERENCE TO RELATED APPLICATION

This application is a continuation of and claims priority to U.S. patent application Ser. No. 14/543,261, filed Nov. 17, 2014, which is hereby incorporated by reference in its entirety.

FIELD OF THE INVENTION

The present application relates to technologies for noise cancellation, noise suppression, and acoustics, and more particularly, to systems and methods for pre-distortion systems via a network for mobile devices.

BACKGROUND

Currently, end users regularly utilize smartphones, computing devices, and other communications-based technologies to place and receive phone calls, access various types of content and services, perform a variety of functions, or a combination thereof. Loudspeakers built into the smartphone, tablet, even the car speaker are often "overdriven" to overpower background noise, such as traffic or engine noise. There exists a quagmire between two competing sides in the design process of small electroacoustic transducers for reproducing sound via loudspeakers. On one hand, there exists a desire to have one or more loudspeakers in a preferably small device that provides audio playback at the highest possible quality and at a high-enough sound level (e.g., for urgent alarms, wake-up alarms in the morning, etc.). On the other hand, manufacturers try to reduce component costs and geometrical size as much as possible, leading to inexpensive designs with sometimes mediocre acoustic qualities, in particular, driving the loudspeakers way above their linear range, and causing considerable nonlinear distortions. Having to cope with nonlinear distortion in the audio created by small devices not only causes lower audio quality for any listener, but also interferes and causes degradation in speech recognition performance in situations when human users talk over audio (e.g., announcements) that is being produced by these loudspeakers because the linear acoustic echo cancellation system (AEC) built into the device assumes that the loudspeaker and microphone of the device are operating as linear only systems. Traditional linear AEC cannot cancel the nonlinear distortions produced by a "rattling" loudspeaker. For example, nonlinearly operated loudspeakers in small devices create two problems: automatic speech recognition (ASR) degradation and perceived low audio quality. Traditionally, nonlinear distortions of "overdriven" small loudspeakers are ignored by the manufacturers of loudspeakers. Listeners sometimes chose to use earphones to listen to their music for better quality sound. However, when it comes to human-machine communication, most users use their smartphones or tablets in "hands free" mode, in effect making this the biggest case for improving the quality of the tiny speakers. Thus, a need exists for improving the sound quality of overdriven small loudspeakers within mobile devices.

SUMMARY

A system and accompanying methods for a pre-distortion system for improved mobile device communications via cancellation of nonlinear distortion are disclosed. The pre-distortion system may transmit an acoustic signal from a network to a device, wherein the acoustic signal includes a linear signal and a nonlinear cancellation signal that cancels at least a portion of nonlinear distortions created once a loudspeaker in the device emits the linear signal. Thus, when a loudspeaker of a mobile device is operating and nonlinear distortions are generated by the loudspeaker or adjacent components of the mobile device in close proximity to the loudspeaker, the pre-distortion system may create one or more nonlinear cancellation signals in the network. The nonlinear cancellation signal may be combined with the linear signal sent to the loudspeaker to cancel the nonlinear distortion signal created by the loudspeaker emitting acoustic sounds from the linear signal. Thus, the nonlinear cancellation signal becomes a pre-distortion signal.

In order to accomplish this, the system and methods may include enabling the communications network to integrate nonlinear cancellation signals with linear signals being sent to a loudspeaker of a device so that when the loudspeaker creates audible sounds, the nonlinear distortion signals created are canceled to improve the audible sound quality of the loudspeaker. By enabling the communications network to conduct this nonlinear acoustic echo cancellation activity, the devices used by users need not have this capability. Thus, the quality of the sound emitted by the loudspeaker of a device is not limited to whether the device has the capability. Instead, the network can provide the device with the nonlinear acoustic echo cancellation capability. In at least one embodiment, the device may have the capability to conduct linear acoustic echo cancellation.

In at least one embodiment, a system for cancellation of nonlinear distortion at loudspeakers in mobile devices is disclosed. The system may include a memory that stores instructions and a processor that executes the instructions to perform operations. The operations may include transmitting an acoustic signal from a network to a device. The acoustic signal may include a linear signal and a nonlinear cancellation signal. The nonlinear cancellation signal may cancel at least a portion of nonlinear distortions created once a loudspeaker in the device emits the linear signal. The operations may also include determining the nonlinear cancellation signal via receiving one or more nonlinear distortion signals at a microphone of the device, receiving the nonlinear distortion signal at the network and generating the nonlinear cancellation signal for the nonlinear distortion signal from the nonlinear distortion signal. The operation of receiving the nonlinear distortion signal at a microphone of the device may also include receiving the nonlinear distortion signal at a microphone of the device after the loudspeaker in the device emits the linear signal, thereby causing the nonlinear distortion signal to be generated. In at least one embodiment, the operations may include selecting the nonlinear cancellation signal from a plurality of nonlinear cancellation signals. The operations may include selecting the nonlinear cancellation signal from a plurality of nonlinear cancellation signals based upon the model of the device. Selecting the nonlinear cancellation signal from a plurality of nonlinear cancellation signals based upon the volume level output of the loudspeaker of the device may be performed.

The system may also perform operations including selecting the nonlinear cancellation signal from a plurality of nonlinear cancellation signals that includes generating a stored nonlinear cancellation signal via receiving one or more nonlinear distortion signals at a microphone of the device, receiving the nonlinear distortion signal at the network, generating the nonlinear cancellation signal for the nonlinear distortion signal from the nonlinear distortion signal, storing the nonlinear cancellation signal in the network to create the stored nonlinear cancellation signal and selecting the nonlinear cancellation signal. The system may also perform operations including forming a profile of nonlinear cancellation signals via repeatedly generating a stored nonlinear cancellation signal via receiving the nonlinear distortion signal at a microphone of the device, receiving the nonlinear distortion signal at the network, generating the nonlinear cancellation signal for the nonlinear distortion signal from the nonlinear distortion signal and storing the nonlinear cancellation signal in the network to create the stored nonlinear cancellation signal over a range of volume level outputs of the loudspeaker of the device and for a plurality of different models of devices. The system may also perform operations including determining a linear cancellation signal via receiving one or more linear signals at a microphone of the device and generating the linear cancellation signal for the linear signal from the linear signal within the device.

In another embodiment, a method for cancellation of nonlinear distortion at loudspeakers in mobile devices is disclosed. The method may include transmitting an acoustic signal from a network to a device, wherein the acoustic signal includes a linear signal and a nonlinear cancellation signal and wherein the nonlinear cancellation signal cancels at least a portion of nonlinear distortions created once a loudspeaker in the device emits the linear signal. The method may include determining the nonlinear cancellation signal via receiving one or more nonlinear distortion signals at a microphone of the device, receiving the nonlinear distortion signal at the network and generating the nonlinear cancellation signal for the nonlinear distortion signal from the nonlinear distortion signal. Receiving the nonlinear distortion signal at a microphone of the device may include receiving the nonlinear distortion signal at a microphone of the device after the loudspeaker in the device emits the linear signal, thereby causing nonlinear distortion signal to be generated. The method may also include selecting the nonlinear cancellation signal from a plurality of nonlinear cancellation signals. The method may include selecting the nonlinear cancellation signal from a plurality of nonlinear cancellation signals based upon the model of the device. The method may also include selecting the nonlinear cancellation signal from a plurality of nonlinear cancellation signals based upon the volume level output of the loudspeaker of the device.

Selecting the nonlinear cancellation signal from a plurality of nonlinear cancellation signals may include generating a stored nonlinear cancellation signal via receiving one or more nonlinear distortion signals at a microphone of the device, receiving the nonlinear distortion signal at the network, generating the nonlinear cancellation signal for the nonlinear distortion signal from the nonlinear distortion signal, storing the nonlinear cancellation signal in the network to create the stored nonlinear cancellation signal and selecting the nonlinear cancellation signal. The method may also include forming a profile of nonlinear cancellation signals via repeatedly generating a stored nonlinear cancellation signal via receiving one or more nonlinear distortion signals at a microphone of the device, receiving the nonlinear distortion signal at the network, generating the nonlinear cancellation signal for the nonlinear distortion signal from the nonlinear distortion signal and storing the nonlinear cancellation signal in the network to create the stored nonlinear cancellation signal over a range of volume level outputs of the loudspeaker of the device and for a plurality of different models of devices. The method may also include determining a linear cancellation signal via receiving one or more linear signals at a microphone of the device and generating the linear cancellation signal for the linear signal from the linear signal within the device.

In another embodiment, a computer-readable device comprising instructions, which when executed by a processor, cause the processor to perform operations for cancellation of nonlinear distortion at loudspeakers in mobile devices is disclosed. The operations include transmitting an acoustic signal from a network to a device, wherein the acoustic signal includes a linear signal and a nonlinear cancellation signal and wherein the nonlinear cancellation signal cancels at least a portion of nonlinear distortions created once a loudspeaker in the device emits the linear signal. The operations may also include determining the nonlinear cancellation signal via receiving one or more nonlinear distortion signals at a microphone of the device, receiving the nonlinear distortion signal at the network and generating the nonlinear cancellation signal for the nonlinear distortion signal from the nonlinear distortion signal.

These and other features of the systems and methods for a pre-distortion system for improved mobile device communications via cancellation of nonlinear distortion are described in the following detailed description, drawings, and appended claims.

DETAILED DESCRIPTION OF THE INVENTION

Figure 1:
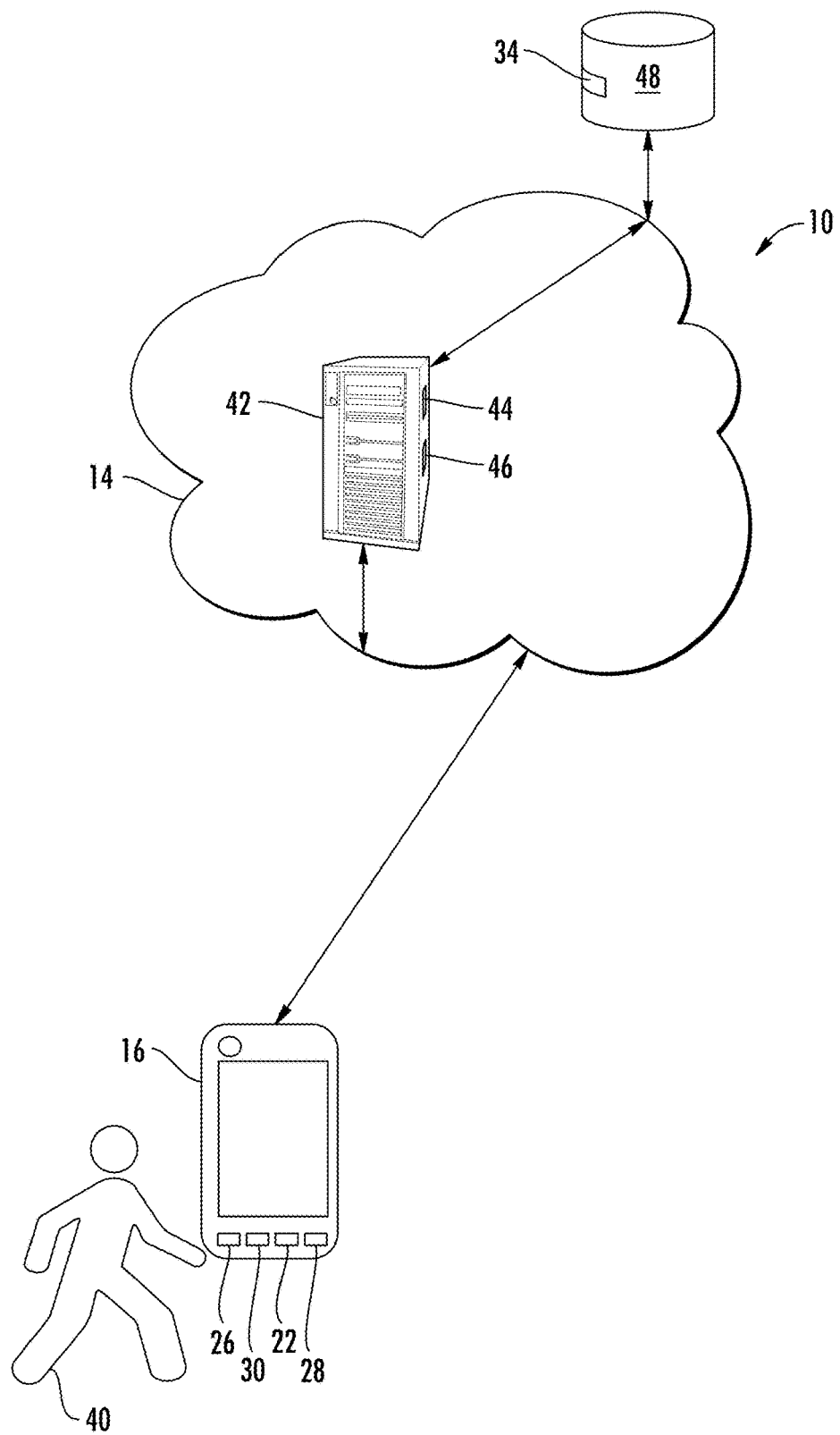
FIG. 1 is a schematic diagram of a pre-distortion system for improved mobile device communications via cancellation of nonlinear distortion.
Figure 2:
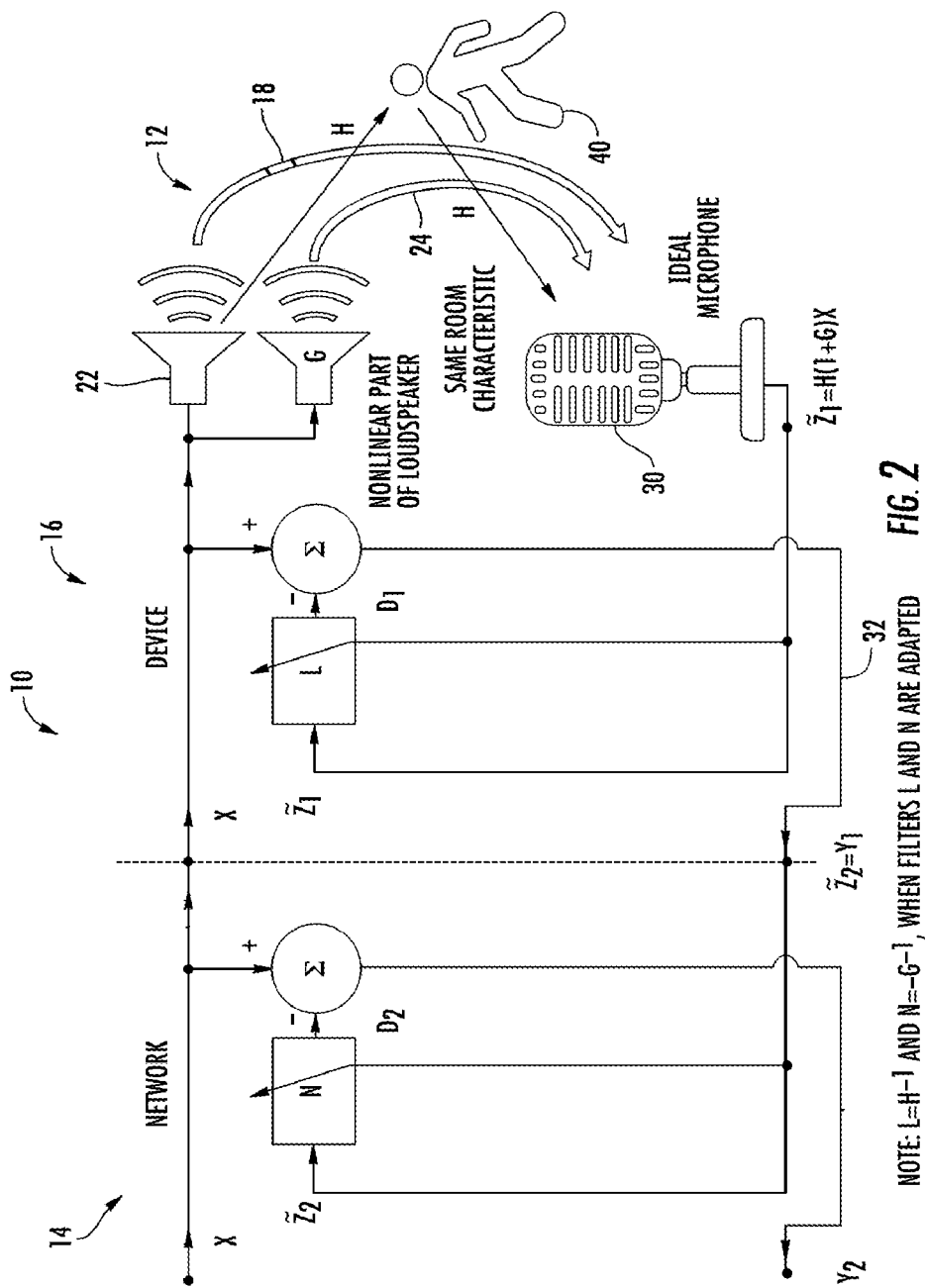
FIG. 2 is a schematic diagram illustrating further details of how the various components, signals, and communication channels of the system of FIG. 1 operate together to create and apply a nonlinear cancellation signal.
Figure 3:
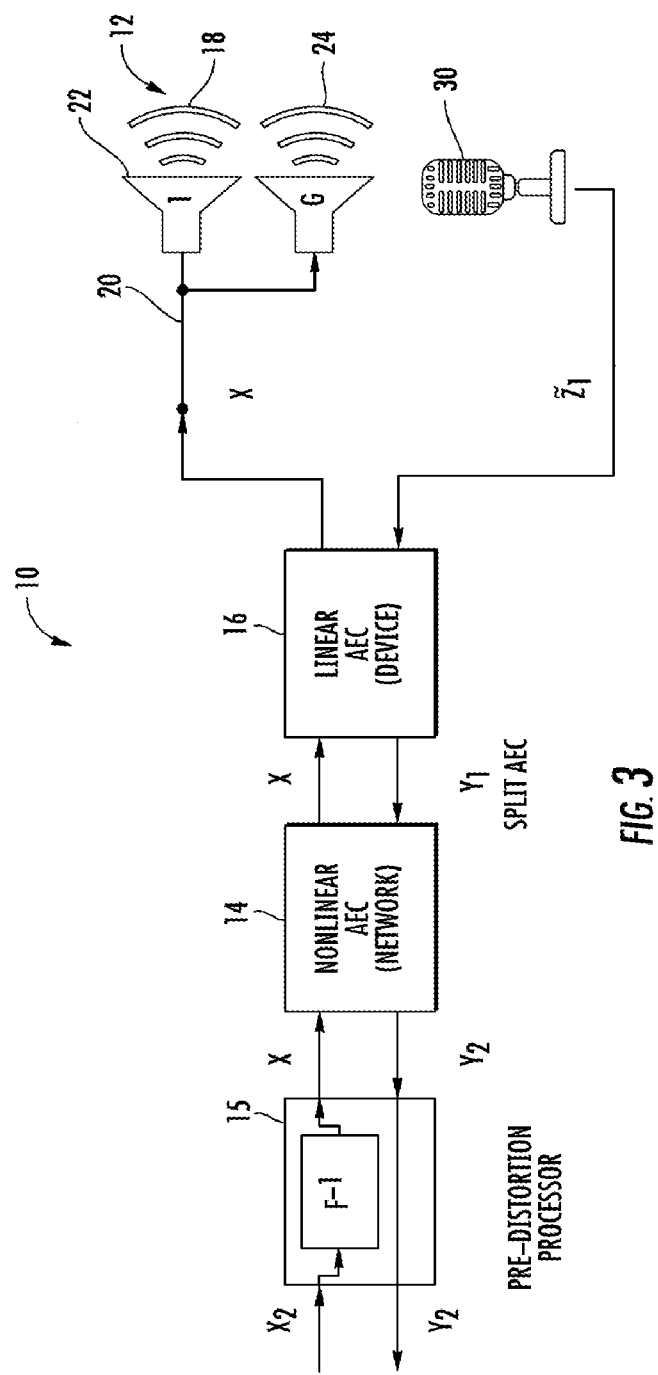
FIG. 3 is another schematic diagram illustrating further details of how the various components, signals, and communication channels of the system of FIG. 1 operate together to create and apply a nonlinear cancellation signal.

As shown in FIGS. 1-5, a pre-distortion system 10 for improved mobile device communications via cancellation of nonlinear distortion is disclosed. The pre-distortion system 10 may transmit an acoustic signal 12 from a network 14 to a device 16, wherein the acoustic signal 12 includes a linear signal 18 and a nonlinear cancellation signal 20 that cancels at least a portion of nonlinear distortions created once a loudspeaker 22 in the device 16 emits the linear signal 18. Thus, when a loudspeaker 22 of a mobile device 16 is operating and nonlinear distortions are generated by the loudspeaker 22 or adjacent components of the mobile device 16 in close proximity to the loudspeaker 22, the pre-distortion system 10 may create one or more nonlinear cancellation signals 20 in the network 14. The nonlinear cancellation signal 20 may be combined with the linear signal 18 sent to the loudspeaker 22 to cancel the nonlinear distortion signal 24 created by the loudspeaker 22 emitting acoustic sounds from the linear signal 18. Thus, the nonlinear cancellation signal 20 becomes a pre-distortion signal 20.

In at least one embodiment, as shown in FIG. 1, the pre-distortion system 10 may include a memory 44 that stores instructions and a processor 46 that executes the instructions to perform operations. The memory 44 and processor 46 may be components of the server 42. The pre-distortion system 10 may be configured to support, but is not limited to, supporting, content delivery services, communications services, automatic speech recognition services, telephone services, cloud computing services, voice-over-internet protocol services (VoIP), software as a service (SaaS) applications, gaming applications and services, productivity applications and services, mobile applications and services, and any other computing applications and services. The pre-distortion system 10 may include a user 40 that may utilize the device 16 to access content, data, and services to initiate and participate in communications sessions or to perform a variety of other functions. For example, the user 40 may utilize the device 16 to establish and handle a communications session, such as a telephone call, with another person, device or the like.

In certain embodiments, the device 16 may be computers, servers, mobile devices, smartphones, computer tablets, phablets, or any other computing devices. In one embodiment, the device 16 may include a memory 26 that includes instructions, and a processor 28 that executes the instructions from the memory 26 to perform various operations that are performed by the device 16. The processor 28 may be hardware, software, or a combination thereof. Additionally, the device 16 may include a microphone 30 configured to receive audio signals and a loudspeaker 22 configured to output audio signals.

The user 40 may utilize the device 16 to communicate with other people, devices, and the like. For example, the user 40 may make telephone calls, conduct chat sessions, send instant messages, send or receive data, or perform any other types of communications with the device 16. Additionally, the user 40 may utilize the device 16 to access and obtain various types of content and services, such as, but not limited to, video content, audio content, web content, text content, automatic speech recognition services, and other speech-related services. Additionally, the user 40 may utilize the device 16 to perform a variety of other tasks and functions. For example, the device 16 may be utilized to conduct networked audio processing techniques, such as, but not limited to speech enhancement processing, acoustic cancellation, and other audio processing techniques. Furthermore, the device 16 may be configured to monitor broadcast mediums, such as communications channels, between any of the devices or components in the pre-distortion system 10.

In certain embodiments, the device 16 may include a software application that may be a cloud-based application, gaming application, an internet-based application, a speech recognition application, a browser application, a mobile application, a productivity application, a video application, a music application, a social media application, a financial application, a news application, any other type of application, or a combination thereof. In certain embodiments, the application may be utilized to provide noise cancellation and suppression services for the user 40. In certain embodiments, at least a portion of the software application may be configured to execute directly on the device 16, however, in other embodiments, the software application may be configured to execute on other devices and components in the pre-distortion system 10.

Notably, the functionality of the pre-distortion system 10 may be supported and executed by using any combination of one or more servers 42 in the communications network 14 or outside of the communications network 14. In one embodiment, the server 42 may include a memory 44 that includes instructions, and a processor 46 that executes the instructions from the memory 44 to perform various operations that are performed by the server 42. Furthermore, the server 42 may include a memory 44 that includes instructions, and a processor 46 that executes the instructions from the memory 44 to perform various operations that are performed by the server 42. The processor 46 may be hardware, software, or a combination thereof. In certain embodiments, the server 42 may be network servers, routers, gateways, computers, mobile devices or any other suitable computing device.

The communications network 14 of the pre-distortion system 10 may be configured to link each of the devices in the pre-distortion system 10 to one another, and be configured to transmit, generate, and receive any information and data traversing the pre-distortion system 10. In one embodiment, the communications network 14 may include any number of additional servers in addition to the server 42. The communications network 14 may also include and be connected to a cloud computing network, a wireless network, an ethernet network, a satellite network, a broadband network, a cellular network, a private network, a cable network, the Internet, an internet protocol network, a multiprotocol label switching (MPLS) network, a content distribution network, a short-range wireless network (e.g. Bluetooth), a fiber optic network, a WiFi network, or any combination thereof. In one embodiment, the communications network 14 may be part of a single autonomous system that is located in a particular geographic region, or be part of multiple autonomous systems that span several geographic regions.

The database 48 of the pre-distortion system 10 may be utilized to store and relay information that traverses the pre-distortion system 10, cache content that traverses the pre-distortion system 10, store data about each of the devices 16 in the pre-distortion system 10 and perform any other typical functions of a database. In one embodiment, the database 48 may be connected to or reside within the communications network 14. Additionally, the database 48 may include a processor and memory or be connected to a processor and memory to perform the various operation associated with the database 48. In certain embodiments, the database 48 may be connected to the server 42, or the device 16, or any combination thereof. The database 48 may also store communications traversing the pre-distortion system 10, store acoustic signal information, store cancellation signal information, store identities for the devices in the pre-distortion system 10, store information about the devices 16, store nonlinear cancellation signals 20, store user preferences, store information about the users 40, store any information traversing the pre-distortion system 10, or any combination thereof. Furthermore, the database 48 may be configured to process queries sent to it by any device in the pre-distortion system 10 or otherwise.

Operatively, the pre-distortion system 10 may provide for cancellation of nonlinear distortion signals 24 to improve audio quality of audible sounds emitted from the loudspeaker 22 in the following manner. In at least one embodiment, the instructions to perform operations may include transmitting an acoustic signal 12 from a network 14 to a device 16. The acoustic signal 12 may include a linear signal 18 and a nonlinear cancellation signal 20. The nonlinear cancellation signal 20 may cancel at least a portion of nonlinear distortions created once a loudspeaker 22 in the device 16 emits the linear signal 18. As such, the nonlinear cancellation signal 20 may be included with the linear signal 18 such that when the linear signal 18 is emitted by the loudspeaker 22, the nonlinear cancellation signal 20 cancels the nonlinear distortion signal 24 created when the loudspeaker 22 emits the linear signal 18, thereby creating an actual audible sound of much better quality that gives the impression the sound is coming from a much better loudspeaker. In at least one embodiment, the nonlinear cancellation signal 20 may be created within a pre-distortion processor 15, which may be a component of the network 14.

The pre-distortion system 10 may obtain a nonlinear cancellation signal 20 in one or more ways. In at least one embodiment, the pre-distortion system 10 may generate a nonlinear cancellation signal 20 in real-time once the loudspeaker 22 of a device 16 has emitted an audible sound from a linear signal 18 and generated a nonlinear distortion signal 24. The pre-distortion system 10 may capture the nonlinear distortion signal 24 and create a nonlinear cancellation signal 20 within the network 14. The nonlinear cancellation signal 20 may then be integrated with the linear signal 18 sent from the network 14 to the loudspeaker 22 on the device 16. In another embodiment, the pre-distortion system 10 may obtain a nonlinear cancellation signal 20 from a profile 34 associated with the device 16. The profile 34 may be stored in any appropriate location, such as, but limited to, the network 14, memory within the cloud and the like.

In one embodiment, the operations of the pre-distortion system 10 may include determining the nonlinear cancellation signal 20 via receiving at least one nonlinear distortion signal 24 at a microphone 30 of the device 16, receiving the nonlinear distortion signal 24 at the network 14 and generating the nonlinear cancellation signal 20 for the nonlinear distortion signal 24 from the nonlinear distortion signal 24. The operation of receiving the nonlinear distortion signal 24 at a microphone 30 of the device 16 further comprises receiving the nonlinear distortion signal 24 at the microphone 30 of the device 16 after the loudspeaker 22 in the device 16 processes the linear signal 18 and emits an audible sound formed of the linear signal 18, thereby causing at least one nonlinear distortion signal 24 to be generated. In particular, the loudspeaker 22 emits one or more linear signals 18 and one or more nonlinear distortion signals 24 that distort the audio experience by F=(1+G) where G is the nonlinear response of the loudspeaker 22.

The pre-distortion system 10 may split the acoustic echo cancellation activity into linear and nonlinear acoustic echo cancellation processing. The nonlinear processing may be run on the network 14. In at least one embodiment, the pre-distortion system 10 may assume that the ideal ("1") and nonlinear portions ("G") of the loudspeaker 22 work in parallel but are subject to the same linear distortion of the loudspeaker 22 and the room, bundled in H, which is the linear response of the loudspeaker 22. G models nonlinearity and room H; $L=H^{-1}$ AND $N=G^{-1}$, when filters L and G are adapted. The incoming remote speech signal x drives the loudspeaker 22, now split into a linear signal 18 and a nonlinear distortion signal 24. On the device 16, from x, a filter version of $\tilde{z}_1=H(1+G)x$. This results in $\tilde{z}_2=y_1=x-d_1$, with $d_1=L\tilde{z}_1=LH(1+G)x$. In the network nonlinear acoustic echo cancellation processing, the output sent upstream is $y_2=x-d_2$, with $d_2=Ny_1=N(x-d_1)=N[1-LH(1+G)]x$. Hence, the output sent back to the remote site is $y_2=\{1-N[1-LH(1+G)]\}x$. If $N[1-LH(1+G)]=1$, cancellation is achieved. This means $L=H^{-1}$ and $N=-G^{-1}$. An assumption is made that no other speech or noise signal is picked up by the microphone. If there is any desired talker active in front of the microphone 30, neither the linear nor the nonlinear acoustic echo cancellation processing will be able to cancel out this statistically independent signal.

The pre-distortion system 10 may process the linear acoustic echo cancellation on the device 16. In particular, the pre-distortion system 10 may assume an ideal microphone 30 and loudspeaker 22 with no linear, nor nonlinear distortions. The pre-distortion system 10 may also assume no other speech or noise signal is picked up by the microphone 30. The incoming remote speech signal x drives the loudspeaker "In". From x, a filtered version of z=Hx is subtracted, resulting in y=x−d, with d=Lz=LHx. The output sent back to the remote site is y=x−d=(LH−1)x. If LH=1, i.e. $L=H^{-1}$. Thus, the pre-distortion system 10 achieves linear cancelation (y=0). The pre-distortion system 10 may determine a linear cancellation signal 32 via receiving one or more linear signals 18 at a microphone 30 of the device 16 and generating the linear cancellation signal 32 for the linear signal 18 from the linear signal 18 within the device 16.

In at least one embodiment, the pre-distortion system 10 may capable of adapting, in real time, to create a pre-distortion nonlinear cancellation signal 24 to cancel nonlinear distortion at the loudspeaker 22. In such an embodiment, the loudspeaker 22 may emit a linear signal 18 and a nonlinear distortion signal 24. The microphone 30 may receive one or more nonlinear distortion signals 24. The nonlinear distortion signal 24 may be transmitted to the network 14. The network 14 may generate a nonlinear cancellation signal 20 for the nonlinear distortion signal 24 from the nonlinear distortion signal 24. The pre-distortion system 10 may store the nonlinear cancellation signal 20 in the network 14 to create a stored nonlinear cancellation signal 20 in connection with a particular device 16. As such, the pre-distortion system 10 has generated a stored nonlinear cancellation signal 20. The pre-distortion system 10 may continue to use the stored nonlinear cancellation signal 20 by combining the stored nonlinear cancellation signal 20 with the linear signal 18 sent from the network 14 to the loudspeaker 22 of the device 16, thereby reducing the nonlinear distortion signal 24 and improving perceived sound quality by a user of the device 16 throughout the remainder of the call.

The pre-distortion system 10 may also form a profile 34 of nonlinear cancellation signals 20 via repeatedly generating stored nonlinear cancellation signals 20 via receiving a nonlinear distortion signal 24 at a microphone 30 of the device 16, receiving the nonlinear distortion signal 24 at the network 14, generating the nonlinear cancellation signal 20 for the nonlinear distortion signal 24 from the nonlinear distortion signal 24 and storing the nonlinear cancellation signal 20 in the network to create the stored nonlinear cancellation signal 20 over a range of volume level outputs of the loudspeaker 22 of the device 16 and for a plurality of different models of devices 16 serviced by the network 14. The profile 34 may be stored within database 48 or other appropriate location.

In at least one embodiment, the operations of the pre-distortion system 10 include selecting the nonlinear cancellation signal 20 from a plurality of nonlinear cancellation signals 20. The plurality of nonlinear cancellation signals 20 may be stored in the profile 34. The nonlinear cancellation signals 20 may be stored within a profile 34 before a linear signal 18 is passed to the loudspeaker 22 of the device 16. In particular, the profile 34 of nonlinear cancellation signals 20 may be created before use of the loudspeaker 22 on the device 16 begins. Thus, the pre-distortion system 10 may include a nonlinear cancellation signal 20 together with the linear signal 18 at the outset of use of the loudspeaker 22 on the device 16, thereby providing enhanced audio quality from the loudspeaker 22 on the device 16 at the outset of use of the loudspeaker 22 on the device 16. In at least one embodiment, operations of the pre-distortion system 10 may include selecting the nonlinear cancellation signal 20 from a plurality of nonlinear cancellation signals 120 based upon a model of the device 16, such as, but not limited to the make and model of the device 16 supported by the network 14. In another embodiment, the nonlinear cancellation signal 20 may be selected from a plurality of nonlinear cancellation signals based upon volume level output of the loudspeaker 22 of the device 16.

Figure 4:
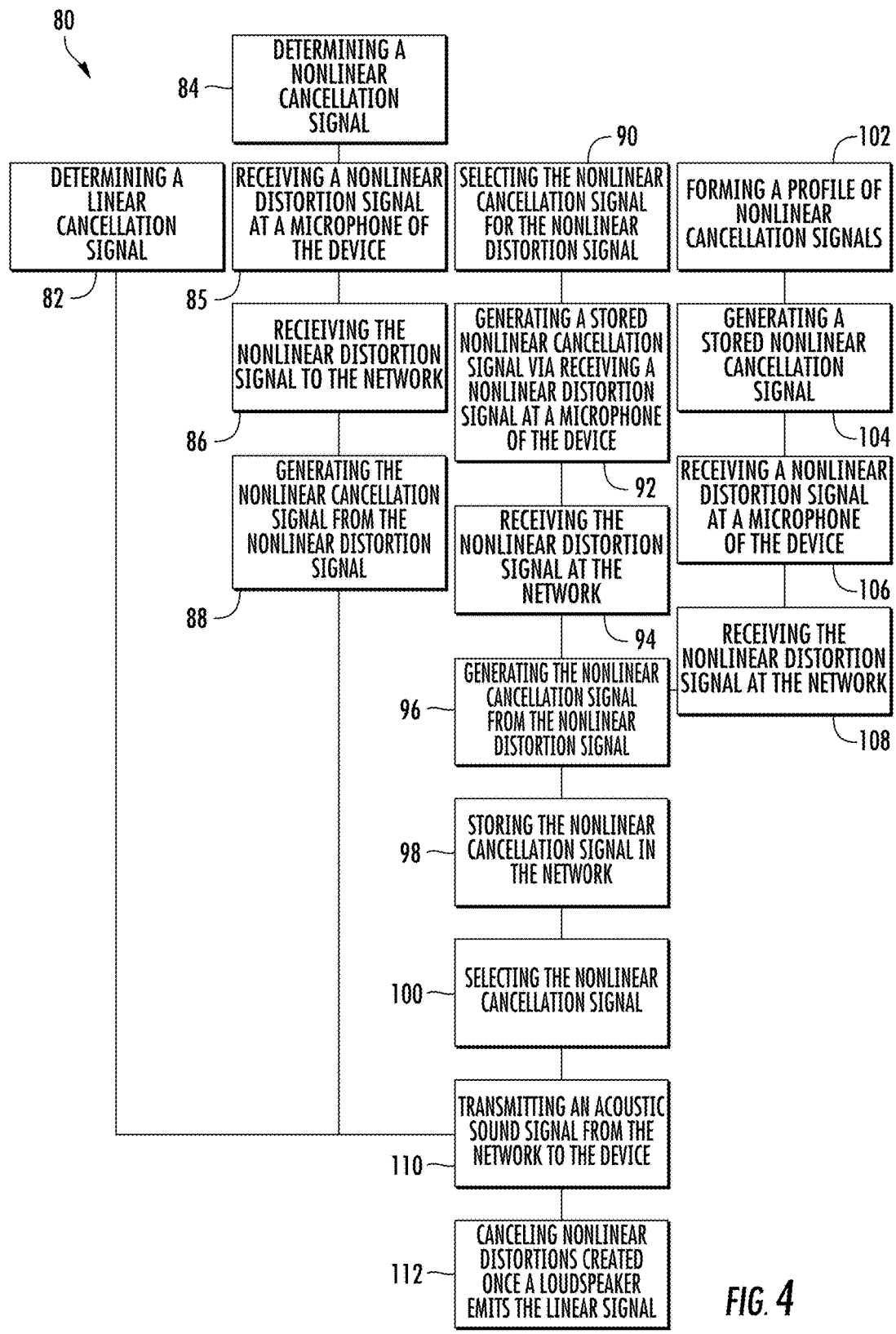
FIG. 4 is a flow diagram illustrating a sample method for nonlinear distortion cancellation via a network according to an embodiment of the pre-distortion system.

As shown in FIG. 4, an exemplary method 80 of improved mobile device communications via cancellation of nonlinear distortion via the pre-distortion system 10 is disclosed. The method may include at step 82 determining a linear cancellation signal 32 via receiving one or more linear signals 18 at a microphone 30 of a device 16 and generating the linear cancellation signal 32 for the linear signal 18 from the linear signal 18 within the device 16. The linear cancellation signal 32 may be used for linear acoustic echo cancellation. The method may include at step 84 determining a nonlinear cancellation signal 20. The step 84 of determining a nonlinear cancellation signal 20 may be accomplished in different ways. In one embodiment, step 84 of determining a nonlinear cancellation signal 20 includes receiving one or more nonlinear distortion signals 24 at a microphone 30 of the device 16 at 85, receiving the nonlinear distortion signal 24 at the network 14 at step 86 and generating the nonlinear cancellation signal 20 for the nonlinear distortion signal 24 from the nonlinear distortion signal 24 at step 88. As such, the nonlinear cancellation signal 20 may be generated in real time such that receiving the nonlinear distortion signal 24 at the microphone 30 of the device 16 comprises receiving the nonlinear distortion signal 24 at a microphone 30 of the device 16 after the loudspeaker 22 in the device 16 emits the linear signal 18, thereby causing one or more nonlinear distortion signals 24 to be generated.

In another embodiment, the step 84 of determining a nonlinear cancellation signal 20 may include selecting a nonlinear cancellation signal 20 from a profile. In particular, the step 84 of determining a nonlinear cancellation signal 20 includes selecting the nonlinear cancellation signal from a plurality of nonlinear cancellation signals at step 90. Selecting the nonlinear cancellation signal from a plurality of nonlinear cancellation signals may be based upon model of the device, volume level output of the loudspeaker of the device or other appropriate characteristic.

The step 90 of selecting the nonlinear cancellation signal 20 from a plurality of nonlinear cancellation signals 20 may also include generating a stored nonlinear cancellation signal 20 via receiving one or more nonlinear distortion signals 24 at a microphone 30 of the device 16 at step 92, receiving the nonlinear distortion signal 24 at the network 14 at step 94, generating the nonlinear cancellation signal 20 for the nonlinear distortion signal 24 from the nonlinear distortion signal 24 at 96 by taking an inverse of the nonlinear distortion signal 24, storing the nonlinear cancellation signal 20 in the network 14 to create the stored nonlinear cancellation signal at 98 and selecting the nonlinear cancellation signal at 100.

The method may also include forming a profile 34 of nonlinear cancellation signals 20 at 102 via, one or more times, generating a stored nonlinear cancellation signal 20 at 104 via receiving one or more nonlinear distortion signals 24 at a microphone 30 of the device 16 at 106, receiving the nonlinear distortion signal 24 at the network 14 at 108, generating the nonlinear cancellation signal 20 for the nonlinear distortion signal 24 from the nonlinear distortion signal 24 at 96 and storing, at 98, the nonlinear cancellation signal 20 in the network 14 to create the stored nonlinear cancellation signal 20 over a range of volume level outputs of the loudspeaker 22 of the device 16 and for one or a plurality of different models of devices 16.

The method may also include, as step 110, transmitting an acoustic signal 12 from a network 14 to a device 16. The acoustic signal 12 may include a linear signal 18 and a nonlinear cancellation signal 20. In at least one embodiment, the acoustic signal 12 may also include a liner cancellation signal 32. The nonlinear cancellation signal 20 may cancel at least a portion of nonlinear distortions created once a loudspeaker 22 in the device 16 emits the linear signal 18. The method may include at step 112 canceling, via the nonlinear cancellation signal, at least a portion of nonlinear distortions created once a loudspeaker 22 in the device 16 emits the linear signal 18.

Figure 5:
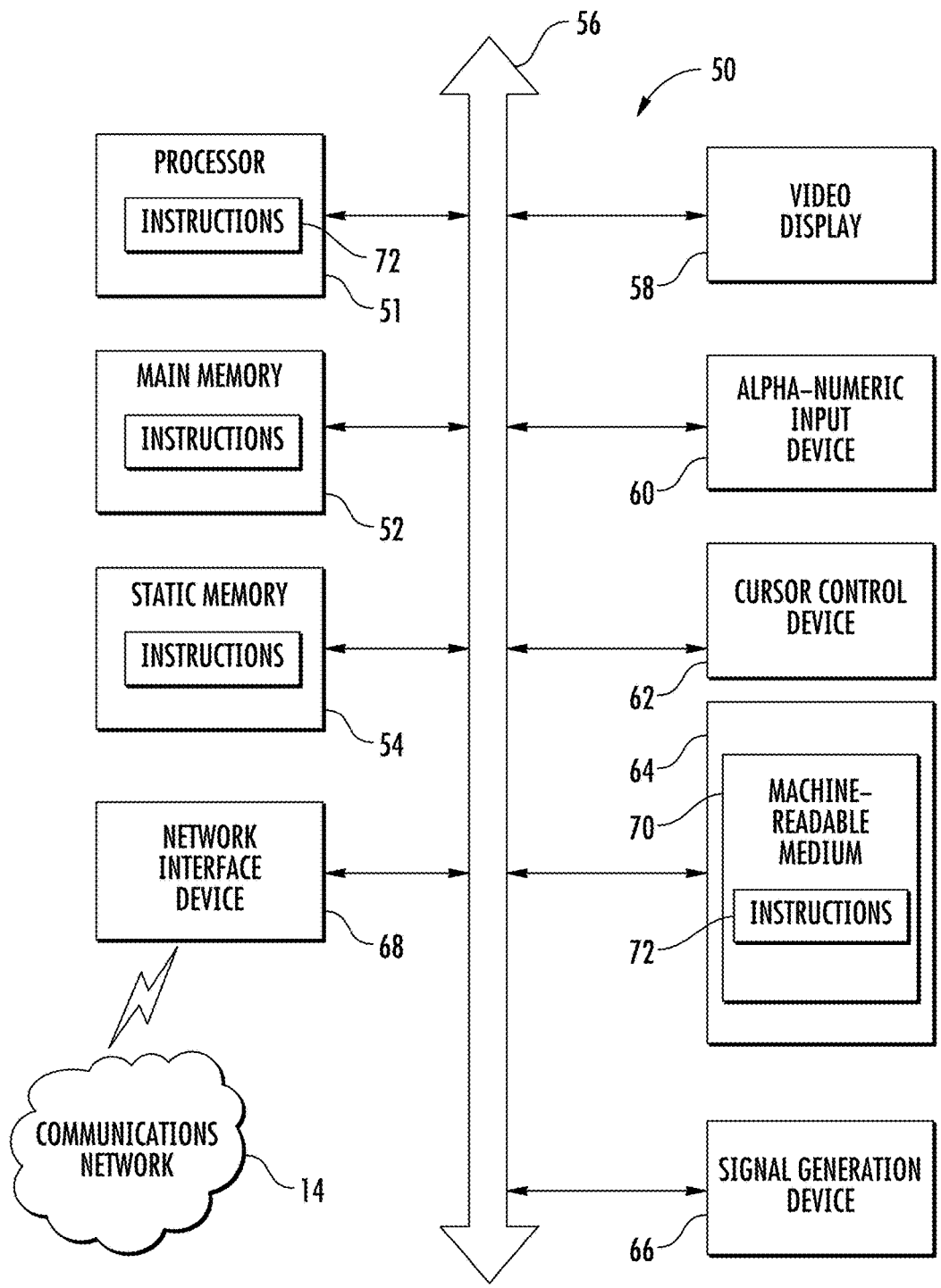
FIG. 5 is a schematic diagram of a machine in the form of a computer system within which a set of instructions, when executed, may cause the machine to perform any one or more of the methodologies or operations of the systems and methods for improved mobile device communications via cancellation of nonlinear distortion.

As shown in FIG. 5, at least a portion of the methodologies and techniques described with respect to the exemplary embodiments of the pre-distortion system 10 can incorporate a machine, such as, but not limited to, computer system 50, or other computing device within which a set of instructions, when executed, may cause the machine to perform any one or more of the methodologies or functions discussed above. The machine may be configured to facilitate various operations conducted by the pre-distortion system 10. For example, the machine may be configured to, but is not limited to, assist the pre-distortion system 10 by providing processing power to assist with processing loads experienced in the pre-distortion system 10, by providing storage capacity for storing instructions or data traversing the pre-distortion system 10, or by assisting with any other operations conducted by or within the pre-distortion system 10.

In some embodiments, the machine may operate as a standalone device. In some embodiments, the machine may be connected (e.g., using communications network 14, another network, or a combination thereof) to and assist with operations performed by other machines, such as, but not limited to, the device 16, or the server 42, or any combination thereof. The machine may be connected with any component in the pre-distortion system 10. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 50 may include a processor 51 (e.g., a central processing unit (CPU), a graphics processing unit (GPU, or both), a main memory 52 and a static memory 54, which communicate with each other via a bus 56. The computer system 50 may further include a video display unit 58, which may be, but is not limited to, a liquid crystal display (LCD), a flat panel, a solid state display, or a cathode ray tube (CRT). The computer system 50 may include an input device 60, such as, but not limited to, a keyboard, a cursor control device 62, such as, but not limited to, a mouse, a disk drive unit 64, a signal generation device 66, such as, but not limited to, a loudspeaker or remote control, and a network interface device 68.

The disk drive unit 64 may include a machine-readable medium 70 on which is stored one or more sets of instructions 72, such as, but not limited to, software embodying any one or more of the methodologies or functions described herein, including those methods illustrated above. The instructions 72 may also reside, completely or at least partially, within the main memory 52, the static memory 54, or within the processor 51, or a combination thereof, during execution thereof by the computer system 50. The main memory 52 and the processor 46 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 70 containing instructions 72 so that a device connected to the communications network 14, other network, or both, can send or receive voice, video or data, and to communicate over the communications network 14, other network, or both, using the instructions. The instructions 72 may further be transmitted or received over the communications network 14, other network, or both, via the network interface device 68.

While the machine-readable medium 70 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
    a memory that stores instructions;
    a processor that executes the instructions to perform operations, the operations comprising:
        canceling, via a nonlinear cancellation signal included within an acoustic signal transmitted to a device, a portion of nonlinear distortions created once a component of the device emits a linear signal, wherein the acoustic signal includes the linear signal and the nonlinear cancellation signal.

2. The system of claim 1, wherein the operations further comprise transmitting the acoustic signal from a network to the device.

3. The system of claim 1, wherein the operations further comprise canceling a portion of nonlinear distortions associated with a different component of the device that is adjacent to the component.

4. The system of claim 1, wherein the operations further comprise determining the nonlinear cancellation signal from a profile.

5. The system of claim 1, wherein the operations further comprise selecting the nonlinear cancellation signal based on a model of the device.

6. The system of claim 1, wherein the operations further comprise selecting the nonlinear cancellation signal based on a volume level output of the component of the device.

7. The system of claim 1, wherein the operations further comprise selecting the nonlinear cancellation signal based on a characteristic of the device.

8. The system of claim 1, wherein the operations further comprise generating the nonlinear cancellation signal based on receiving a nonlinear distortion signal at a microphone of the device.

9. The system of claim 8, wherein the operations further comprise generating the nonlinear cancellation signal by performing an inverse on the nonlinear distortion signal.

10. The system of claim 1, wherein the operations further comprise forming a profile including a plurality of nonlinear cancellation signals.

11. The system of claim 10, wherein the operations further comprise selecting the nonlinear cancellation signal from the plurality of nonlinear cancellation signals.

12. The system of claim 1, wherein the operations further comprise determining a linear cancellation signal based on receiving the linear signal at a microphone of the device.

13. The system of claim 12, wherein the operations further comprise generating the linear cancellation signal for the linear signal from the linear signal of the device.

14. A method, comprising:
canceling, by utilizing instructions from a memory that are executed by a processor and via a nonlinear cancellation signal included within an acoustic signal transmitted to a device, a portion of nonlinear distortions created once a component of the device emits a linear signal, wherein the acoustic signal includes the linear signal and the nonlinear cancellation signal.

15. The method of claim 14, further comprising selecting the nonlinear cancellation signal based on a characteristic of the device.

16. The method of claim 14, further comprising generating the nonlinear cancellation signal by performing an inverse on the nonlinear distortion signal.

17. The method of claim 14, further comprising canceling a portion of nonlinear distortions associated with a different component of the device that is adjacent to the component.

18. The method of claim 14, further comprising selecting the nonlinear cancellation signal from a profile including a plurality of nonlinear cancellation signals.

19. The method of claim 14, further comprising generating the nonlinear cancellation signal based on receiving a nonlinear distortion signal at a microphone of the device.

20. A non-transitory computer-readable device comprising instructions, which when executed by a processor, cause the processor to perform operations comprising:
canceling, via a nonlinear cancellation signal included within an acoustic signal transmitted to a device, a portion of nonlinear distortions created once a component of the device emits a linear signal, wherein the acoustic signal includes the linear signal and the nonlinear cancellation signal.

* * * * *